United States Patent [19]

Kaya et al.

[11] Patent Number: 5,055,956
[45] Date of Patent: Oct. 8, 1991

[54] COMPOSITE MAGNETIC HEAD ASSEMBLY FOR GUIDING A MAGNETIC TAPE WITH IMPROVED STABILITY

[75] Inventors: Akimasa Kaya; Takashi Niinuma, both of Tokyo, Japan

[73] Assignee: Teac Corporation, Tokyo, Japan

[21] Appl. No.: 339,807

[22] Filed: Apr. 18, 1989

[30] Foreign Application Priority Data

Apr. 18, 1988 [JP] Japan ................................ 63-95080

[51] Int. Cl.$^5$ ............................................. G11B 5/56
[52] U.S. Cl. ............................... 360/109; 360/130.21
[58] Field of Search ........... 360/104, 106, 109, 130.21, 360/130.2

[56] References Cited

U.S. PATENT DOCUMENTS

| | | | |
|---|---|---|---|
| 3,893,188 | 7/1975 | Shoemaker | 360/109 X |
| 4,158,868 | 6/1979 | Jenkins | 360/109 |
| 4,523,242 | 6/1985 | Saito et al. | 360/109 |
| 4,783,709 | 11/1988 | Koizumi et al. | 360/109 |

FOREIGN PATENT DOCUMENTS 0562135  1/1981  Japan.

Primary Examiner—Robert S. Tupper
Assistant Examiner—Andrew L Sniezek
Attorney, Agent, or Firm—Michael N. Meller

[57] ABSTRACT

A composite type magnetic head assembly comprises a first magnetic head, a first base supported on a body of a tape recorder for carrying the first magnetic head, a first supporting mechanism for supporting the first base on the body of the tape recorder such that the first magnetic head is rotatable about a hypothetical axis passing through the first magnetic head in a direction parallel to a tape transport direction, a second base supported on the first base, a second magnetic head supported on the second base in a downstream side of the tape transport direction relative to the first magnetic head, and a second supporting mechanism provided on the base such that the second magnetic head is rotatable about the hypothetical axis independently from the first magnetic head, wherein the first and second magnetic heads are rotated about the hypothetical axis in mutually opposing directions.

5 Claims, 4 Drawing Sheets

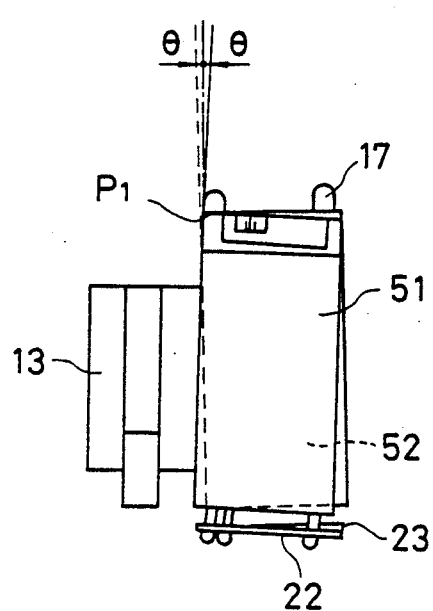
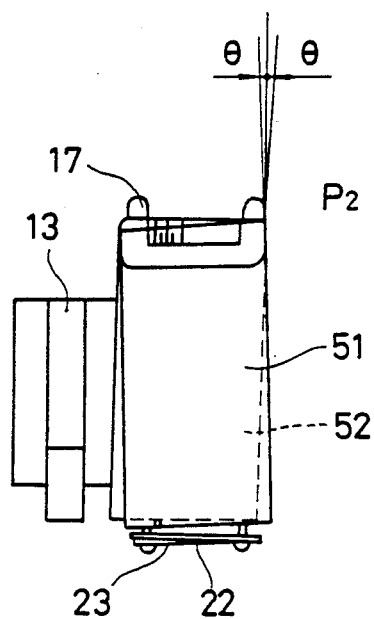
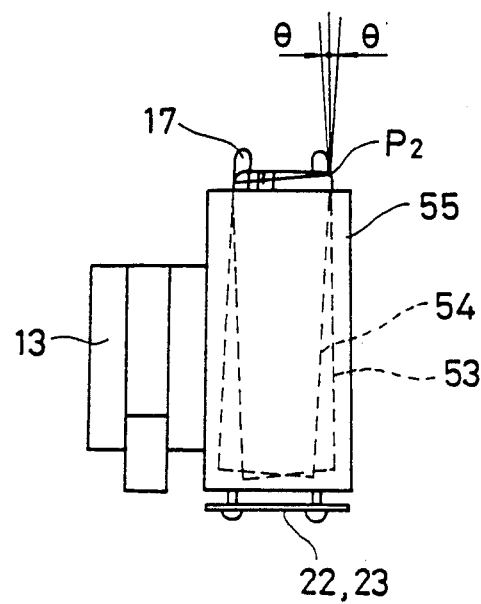

COMPOSITE MAGNETIC HEAD ASSEMBLY FOR GUIDING A MAGNETIC TAPE WITH IMPROVED STABILITY

BACKGROUND OF THE INVENTION

The present invention generally relates to so called composite type magnetic head assemblies for magnetic tape recorders, comprising a pair of magnetic heads provided on a single base body, one for recording and one for playback, or both for recording and playback, along a direction of tape transportation, and in particular to a composite type magnetic head assembly designed to provide an improved contact between the magnetic tape and the magnetic heads wherein a zigzag movement or lateral deviation of the magnetic tape during tape transportation when passing the tape through the magnetic head assembly is eliminated.

In a commonly used audio magnetic tape cassette such as the one called a compact cassette, a window is defined in the tape cassette so as to allow contact for the magnetic tape contained therein with a magnetic head of a tape recorder. In such a tape cassette, a pressure pad is provided in correspondence to the window for urging the magnetic tape to the magnetic head so as to maintain a stable contact between the magnetic tape and the magnetic head.

Conventionally, there is a tape recorder called three head-type tape recorder wherein three separate magnetic heads are used for recording, reproducing and erasing respectively. In such a tape recorder, it is necessary to design the magnetic head such that both of the recording head and reproducing heads make contact with the magnetic tape through the window in the tape cassette. For this purpose, a so-called composite type magnetic head assembly is commonly used wherein the recording head and the reproducing head are assembled as a unitary body such that the recording and reproducing heads are aligned adjacent to each other along a transport direction of the magnetic tape.

There are various modifications in the composite type magnetic head assembly. A typical example of such a composite type magnetic head assembly is the one used commonly for recording and playback of a two channel stereo signal on and from the magnetic tape having a four track format. Further, there is a composite type magnetic head assembly designed to record and reproduce an eight channel audio signals or data on and from the magnetic tape in an eight track format. In this type of magnetic head assembly, a pair of magnetic heads each carrying four magnetic cores thereon are mounted on a common base body adjacent to each other along the tape transport direction such that the four magnetic cores of the first magnetic head are disposed alternately to the four magnetic cores of the second magnetic head and such that there are eight tracks defined laterally on the magnetic tape. In the composite magnetic head assembly having such a construction, both of the magnetic heads are used for recording and for playback.

In such a composite type magnetic head assembly, the magnetic cores in each of the magnetic heads have to trace the corresponding tracks precisely. For example, in the composite type magnetic head assembly of the first mentioned type where a two channel stereo signal is recorded on the magnetic tape in the four track format, it is necessary that the magnetic core in the reproducing head traces the track defined by the magnetic core in the recording head exactly. For this purpose, there is a prior art construction (Japanese Laid-open Utility Model Application No. 56-2135) in which the recording head and reproducing head are held independently on a common base body such that the magnetic heads are adjustable in a lateral direction of the magnetic tape.

In this prior art construction, one of the magnetic heads such as the recording head is mounted on the base body via a base plate such that the position of the magnetic head is adjustable in the lateral direction of the magnetic tape. At the same time, the other of the magnetic heads such as the reproducing head is mounted directly on the base body. Further, the base body itself is held on a chassis or frame of the tape recorder by connecting screws such that the magnetic heads carried thereon can be rotated or tilted relative to the magnetic tape unitarily with the base body about a hypothetical axis which extends parallel to the tape transport direction. As a result of this, a tilt angle of the magnetic head is adjusted. Furthermore, by adjusting the screws in this prior art construction, it is possible to rotate the base body about another axis extending perpendicularly to a plane of the magnetic tape passing through the magnetic head assembly. As a result, the orientation of the magnetic head relative to the tape transporting direction in the plane of the magnetic tape or so called azimuth angle is adjusted.

In such a prior art composite magnetic head assembly, one can adjust the position and orientation of the magnetic heads such that gaps provided in the magnetic cores of the recording and reproducing heads trace an exactly identical track with a proper azimuth angle. However, such a prior art composite type magnetic head assembly has a problem in that the construction for mounting the magnetic heads on the chassis of the tape recorder is complex and there is a tendency that the mounting state becomes non-uniform in the recording head and in the reproducing head. When such a difference exists in the mounting state, the position and direction of a contacting surface provided on the magnetic head for guiding the magnetic tape contacting therewith tends to differ in the recording head and the reproducing head. In other words, the magnetic tape is guided in different directions in each of the magnetic heads and there is a substantial risk that the magnetic tape is transported zigzag across the composite magnetic head assembly or deviated laterally during the tape transportation. Such an unstable tape transport tends to appear also as a result of the adjustment of the magnetic heads performed independently to each other, as such an adjustment tends to invite disagreement in the guiding action of the contacting surfaces of the recording and reproducing heads.

Of course, these problems can be avoided when one uses a primitive composite magnetic head assembly where the recording and reproducing heads are fixed each other as a unitary body and there is formed a common contacting surface. In such a magnetic head assembly, however, it is not possible to adjust the magnetic heads independently and is disadvantageous for adjusting the gaps in the magnetic heads to trace an identical track on the magnetic tape.

When the tape transport becomes unstable, a uniform contact between the magnetic tape and the head is lost and there may be a fluctuation in the output level or dropout in the reproduced signal in the extreme case.

SUMMARY OF THE INVENTION

Accordingly, it is a general object of the present invention to provide a novel and useful composite type magnetic head assembly wherein the problems aforementioned are eliminated.

Another and more specific object of the present invention is to provide a composite type magnetic head assembly for allowing independent adjustment of a recording head and a reproducing head aligned each other along a tape transport direction, for a position in the lateral direction of the tape, a tilt angle relative to the plane of the tape, and an azimuth angle relative to the transportation direction of the tape.

Another object of the present invention is to provide a composite type magnetic head assembly further capable of providing a stable tape transportation across the magnetic head assembly.

Another object of the present invention is to provide a composite type magnetic head assembly comprising a pair of magnetic heads aligned along a tape transport direction so as to be located adjacent to each other on a common base body, wherein one of the magnetic heads is rotated in a clockwise direction about an axis passing through the first and second magnetic heads in a direction parallel to the tape transport direction and the other of the magnetic heads is rotated in a counterclockwise direction about the same axis. According to the present invention, the magnetic tape is deformed so as to have a generally U-shaped transversal cross section opened upwards when passed through the magnetic head assembly, wherein the magnetic tape is supported from both sides by respective contacting surfaces of the first and second magnetic heads. As a result, the magnetic tape spontaneously returns to a center of the magnetic head assembly even when the magnetic tape is deviated laterally during the tape transportation. As a result of such a stabilization in the tape transportation, the magnetic tape is contacted uniformly with the contacting surfaces of the first and second magnetic heads and the recording and playback of signals on and from a track in a vicinity of a side edge of the magnetic tape can be made with reliability. Associated with the stabilization in the tape transportation, the tape tension can be reduced which in turn brings a reduction in the wow and flatter as well as the reduction in the wear of the magnetic heads.

BRIEF DESCRIPTION OF THE DRAWINGS

FIG. 7 is a side view similar to FIG. 2 showing a fourth embodiment of the composite type magnetic head assembly of the present invention;

FIG. 8 is a side view similar to FIG. 7 showing a modification of the composite type magnetic head assembly of FIG. 7; and FIG. 9 is a side view similar to FIG. 2 showing a fifth embodiment of the composite type magnetic head assembly of the present invention.

DETAILED DESCRIPTION

Figure 1:
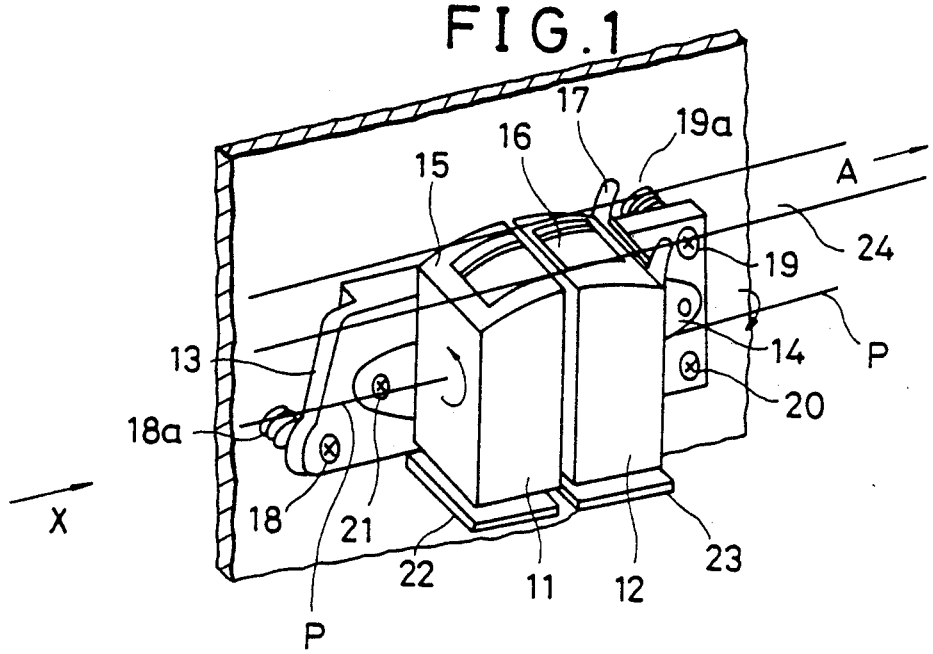
FIG. 1 is a perspective view showing a first embodiment of the composite type magnetic head assembly of the present invention.
Figure 2:
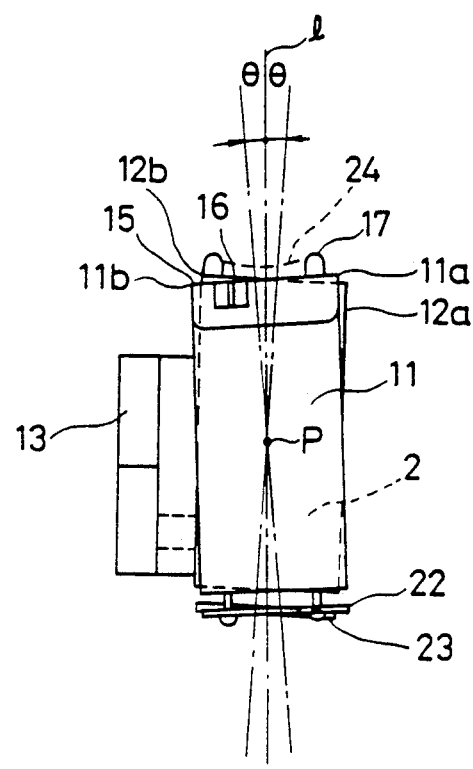
FIG. 2 is a side view of the assembly of FIG. 1 viewed along a direction illustrated by an arrow X in the drawing.
Figure 3:
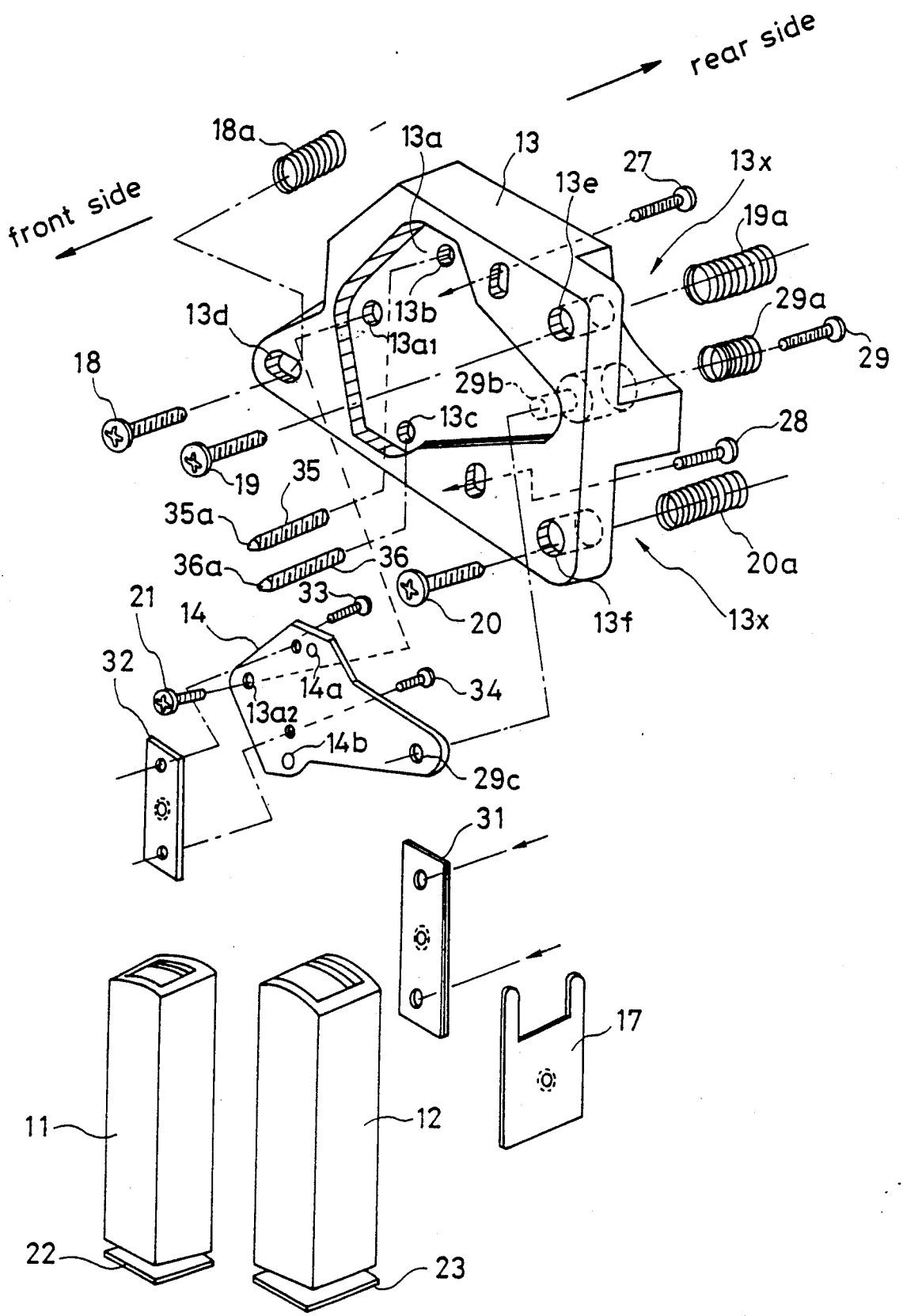
FIG. 3 is an exploded perspective view showing the detailed construction of the composite type magnetic head assembly of FIG. 1.

FIGS. 1 through 3 show a first embodiment of the composite type magnetic head assembly of the present invention. Referring to the drawings, the composite type magnetic head assembly is designed for recording and playing back a two channel stereo signal on and from a magnetic tape 24 according to a commonly used four track format in which a pair of tracks are defined in one side of the magnetic tape and another pair of tracks are defined in the other side of the magnetic tape. The composite type magnetic head assembly comprises a recording head 11 and a reproducing head 12 which are mounted adjacent to each other on a base body 13 so as to be aligned in a tape transportation direction A. It should be noted that the heads 11 and 12 are tilted or rotated respectively axis P passing through the heads 11 and 12 in the direction A as will be described.

Referring to FIG. 2, which is a side view of the composite type magnetic head assembly viewed from a direction X parallel to the direction A as illustrated in FIG. 1, it can be seen that the recording head 11 is rotated about the axis P in a counter clockwise direction for an angle $\theta$ with respect to a hypothetical vertical line 1 which is drawn perpendicularly to a general plane of the magnetic tape 24. In FIG. 2, the axis P is perpendicular to the plane of the paper. Similarly, the magnetic head 12 is rotated about the axis P in a clockwise direction with respect to the vertical line 1 for an angle $\theta$. The angle $\theta$ for the magnetic head 11 or the angle $-\theta$ for the magnetic head 12 is called a tilt angle. In FIGS. 1 and 2, the tilt angles are exaggerated in order to show the relationship between the magnetic heads 11 and 12 clearly.

As a result of the tilt angles of the magnetic head 11, a contacting surface 15 of the magnetic head 11 to be contacted with a magnetic tape 24 for guiding the tape is also tilted, whereby an upper right corner 11a of the magnetic head 11 projects upwards relative to a corresponding corner 12a of the magnetic head 12 and an upper left corner 12b of the magnetic head 12 projects upwards relative to a corresponding corner 11b of the magnetic head 11. It should be noted that the magnitude of the tilt angle for the magnetic head 11 is made equal to the magnitude of the tilt angle for the magnetic head 12 except for the direction.

Next, a mechanism for providing the tilt angles for the magnetic heads 11 and 12 will be described with reference to FIG. 3.

The reproducing head 12 carries a mounting plate 31 which is mounted on the base body 13 directly such that there is no tilt angle between the magnetic head 12 and the base body 13. The mounting plate 31 may be attached to the magnetic head 12 by adhesive or spot welding and is fixed on the base body 13 by screws 27 and 28.

Further, the base body 13 is formed with a depression 13a for accommodating a sub-base body 14 on which the recording head 11 is carried. More specifically, the recording head 11 carries a mounting plate 32 and the mounting plate 32 is fixed on the sub-base body 14 by screws 33 and 34.

In the depression 13a, a pair of threaded holes 13b and 13c are provided so as to be aligned in a direction substantially perpendicular to the direction A, and a pair of adjusting screws 35 and 36 each having a sharp pointed ends 35a or 36a are screwed in the holes 13b and 13c such that these sharp pointed ends 35a and 36a are accepted in corresponding depressions 14a and 14b provided on a rear side of the sub-base body 14. It should be noted that the adjusting screws 35 and 36 are formed with hexagonal depressions (not shown) on their rear ends so as to accept tools used for driving the screws. By adjusting the amount of projection of the screws 35 and 36, the sub-base body 14 is tilted by a predetermined tilt angle, whereby the recording head 11 carried thereon is also tilted. In the illustrated embodiment, the sub-base body 14 is tilted so as to provide a tilt angle of $2\theta$ for the recording head 11 relative to the reproducing head 12. After the adjustment, the adjusting screws 35 and 36 are fixed on the base body 13 by potting.

The sub-base plate 14 is further held by a screw 21 screwed in a threaded hole $13a_1$ of the depression 13a. A compression spring 21a is wound around the screw 21 so as to be interposed between the sub-base body 14 and the base body 13. By adjusting the screw 21, a lateral position of the magnetic head 11 in the lateral direction of the magnetic tape 24 is adjusted while maintaining the same tilt angle set by the adjustment of the screws 35 and 36. When the screw 21 is adjusted, the sub-base body 14 is moved about the screws 35 and 36 acting as the fulcrum. Furthermore, another screw 29 is screwed in a threaded hole 29c provided on the sub-base body 14 from the rear side of the body 14 through a penetrating hole 29b in the base body 13. This penetrating hole 29b accepts the screw 29 such that the screw 29 can move through the hole 29b freely. As illustrated, another compression spring 29a is interposed between a head of the screw 29 and the rear side of the base body 13. As a result of the adjustment of the screw 29, an azimuth angle of the magnetic head 11 which is the angle between the head 11 and the tape transport direction A in the plane of the magnetic tape 24 can be adjusted.

The composite magnetic head assembly comprising the recording head 11, reproducing head 12 and the base body 13 thus assembled is mounted in turn on a chassis of a tape recorder (not shown). More specifically, the base body 13 is supported on the chassis by a screw 18 inserted into an elongated hole 13d from a front side of the body 13 so as to project beyond its rear side and screwed in a corresponding threaded hole (not shown) in the chassis, a compression spring 18d wound around the screw 18 and interposed between the base body 13 and the chassis, a screw 19 mounted on the chassis similarly to the screw 18 through a round hole 13e, a compression spring 19a wound around the screw 19 similarly to the spring 18a, a screw 20 mounted similarly to the screw 18 on the chassis through another round hole 13f, and a compression spring 20a wound around the screw 18 similarly to the spring 18a.

According to this construction, the azimuth angle for the entire composite magnetic head assembly is adjusted by adjusting the screw 18. It should be noted that the holes 13d, 13e and 13f have a diameter which is slightly larger than the diameter of the corresponding screws 18, 19 and 20 so that the level of the base body 13 relative to the chassis of the tape recorder can be adjusted freely by tightening or loosening these screws. For example, the overall level of the magnetic heads 11 and 12 can be changed by adjusting the screw 19 and the overall tilt angle of the magnetic heads 11 and 12 can be changed by adjusting the screw 20.

The base body 13 further has a depression generally represented by a numeral 13x on its rear side for accommodating an end of the springs 18a–20a. As a result of the depression 13x, the base body 13 has a generally T shaped end view on its right side as can be seen in FIG. 3.

In the conventional composite type magnetic head assembly, the tilt angle $\theta$ or $-\theta$ for the magnetic heads 11 and 12 have been adjusted to zero with respect to the vertical plane 1. In the composite type magnetic head assembly of the present invention, on the contrary, the tilt angle $\theta$ is intentionally given a finite value such that the magnetic head 11 tilts in one direction by the angle $\theta$ and such that the magnetic head 12 tilts in the other direction by the angle $-\theta$. The adjustment of the tilt angle is made by contacting an adjusting gauge (not shown) on the contacting surfaces 15 and 16 of the magnetic heads 11 and 12. As the reproducing head 12 is mounted on the base body 13 directly in the present embodiment with no tilt angle between the head 12 and the base body 13, the recording head 11 is tilted for an angle of $2\theta$ in the counter clockwise direction about the axis P relative to the magnetic head 12 and the base body 13 is tilted in the clockwise direction for an angle of $\theta$ about the axis P relative to the vertical line 1 in order to achieve the tilt angle $\theta$ for the magnetic head 11 and the tilt angle $-\theta$ for the magnetic head 12 as shown in FIG. 2. As a result, the magnetic heads 11 and 12 are positioned such that the corner 11a of the head 11 and the corner 12b of the head 12 projects upwards relative to the general plane of the magnetic tape 24 for an identical distance.

According to the experiments conducted by the applicant, it was found that the tilt angle of about 15 minutes relative to the general plane of the magnetic tape 24 provides a most preferable result. Therefore, the tilt angle $\theta$ of the present invention is set to 15 minutes.

When the magnetic tape 24 is passed through the tape contacting surfaces 15 and 16 of the magnetic heads 11 and 12 thus tilted by a tape driving mechanism (not shown) of the tape recorder under a proper tape tension while being pressed against the magnetic heads by a pressure pad (not shown) in the tape cassette, the magnetic tape 24 first engages with the contacting surface 15 and is tilted In the counter clockwise direction by the surface 15. Thereafter, the magnetic tape 24 is engaged with the contacting surface 16 of the magnetic head 16 and is tilted in the clockwise direction by the surface 16. Further, the magnetic tape 24 returns to horizontal after passing through the a tape guide 17 at a downstream side of the magnetic head 12. As a result, the magnetic tape 24 is deformed when passing through the magnetic head assembly such that the magnetic tape 24 has a generally U-shaped transversal cross section as illustrated by a broken line in FIG. 2. In other words, the magnetic tape 24 is supported from both sides by the contacting surface 15 and the contacting surface 16 and any deviation of the tape in the lateral direction is spontaneously corrected. Further, the contact of the magnetic tape 24 with the recording head 11 and the reproducing head 12 becomes uniform for entire tape width. As a result, the response of the signals at the time of recording or playback is significantly improved. It should be noted that the direction of the tilt of the heads 11 and 12 may be reversed.

Figure 4:
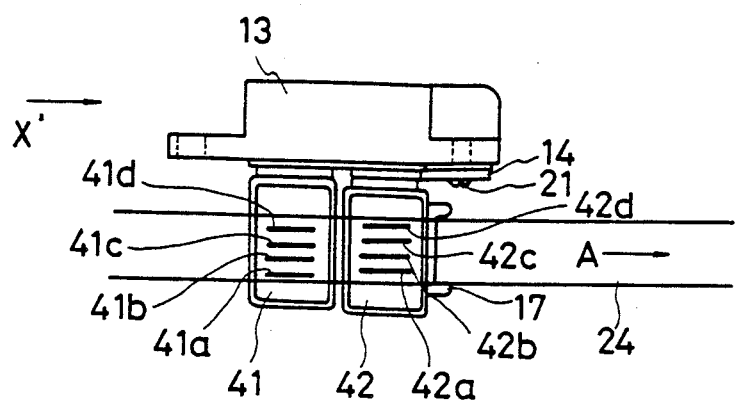
FIG. 4 is a plan view showing a second embodiment of the composite type magnetic head assembly of the present invention.
Figure 5:
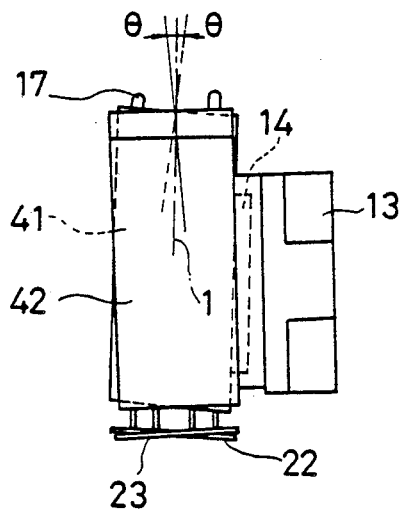
FIG. 5 is a side view of the assembly of FIG. 4 viewed along a direction illustrated by an arrow X' of FIG. 4.

FIGS. 4 and 5 show a second embodiment of the composite type magnetic head assembly of the present invention. In the drawing, these parts constructed identically to those corresponding parts in the preceding drawings are given identical reference numerals and the description thereof will be omitted.

Referring to the drawings, the magnetic head assembly is designed as a multi-track head assembly for an eight channel signal and comprises a four track magnetic head 41 and another four track magnetic head 42 which are held on the base body 13 and the sub-base body 14 so as to be aligned in the tape transporting direction adjacent from each other similarly to the first embodiment. In other words, the magnetic heads 41 and 42 are mounted such that their tilt angles, azimuth angles and the head positions in the lateral direction of the tape are adjustable independently. The magnetic heads 41 and 42 are used in common for recording and playback and carry a set of magnetic cores 41a–41d or another set of magnetic cores 42a–42d as illustrated. In each of the magnetic heads 41 and 42, the magnetic cores are disposed along the lateral direction of the magnetic tape with an interval corresponding to one track width across a pair of adjacent magnetic cores. Further, the cores 41a–41d and the cores 42a–42d are displaced from each other in the lateral direction of the magnetic tape 24 such that the cores in the head 41 and the cores in the head 42 are positioned alternately. Similarly to the first embodiment, the magnetic heads 41 and 42 are tilted in opposite directions by a same tilt angle. The present invention is particularly effective in achieving a uniform contact for all of the tracks on the magnetic tape including those close to the edge of the tape with the corresponding magnetic cores in the magnetic heads.

Next, a third embodiment of the present invention will be described with reference to FIG. 6. In the drawing, these parts constructed identically to those corresponding parts in the preceding drawings are given identical reference numerals and the description thereof will be omitted.

Figure 6:
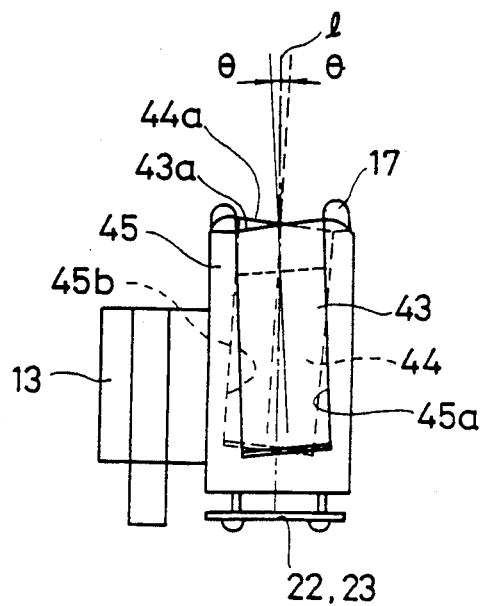
FIG. 6 is a side view similar to FIG. 2 showing a third embodiment of the composite type magnetic head assembly of the present invention.

Referring to FIG. 6, the tilt angle for a pair of magnetic heads 43 and 44 is given by holding the magnetic heads in a case 45 which holds the heads 43 and 44 such that the head 43 is tilted by the angle $\theta$ and the head 44 is tilted oppositely by the angle $-\theta$. It should be noted that the case 45 or the base body 13 carrying the case 45 is not tilted. According to this embodiment, the predetermined tilt angles are provided on respective contacting surfaces 43a and 44a of the magnetic heads without tilting the base body 13 and the adjustment for the tilt angles is simplified. As a result, assembling of the the magnetic head assembly is facilitated.

In this embodiment, the case 45 is defined with guide surfaces 45a and 44b which hold the magnetic heads 43 and 44 with the predetermined tilt angles when the heads are fitted into the case 45. Alternatively, there may be provided a suitable spacer member in the case 45 to hold the magnetic heads 43 and 44 with the predetermined tilt angles. In this case, the magnetic heads are inserted into the case 45 is a loose state and after the adjustment for the tilt angles using the spacer, the magnetic heads and the spacer are fixed in the case 45 by potting and the like after the adjustment.

FIG. 7 shows a fourth embodiment of the present invention. In the drawing, these parts constructed identically to corresponding parts in the preceding drawings are given identical reference numerals and the description thereof will be omitted.

Referring to FIG. 7, the composite type magnetic head assembly of this embodiment comprises a magnetic head 51 and another magnetic head 52 aligned in the direction of the tape transportation which is perpendicular to the plane of the paper. The magnetic heads 51 and 52 are held on the base body 13 such that the magnetic head 51 is tilted in the clockwise direction relative to the magnetic head 52 held directly on the base body 13 by the $2\theta$ angle about a hypothetical axis P1 passing through the heads 51 and 52 in the tape transport direction A at their upper left corners. Similarly to the first embodiment, the base body 13 is tilted oppositely to the magnetic head 51 in the counter clockwise direction by the angle $\theta$.

FIG. 8 shows a modification of the assembly of FIG. 7 wherein the magnetic heads 51 and 52 are rotated about another hypothetical axis P2 passing through the upper right corners of the magnetic heads 51 and 52 such that they are tilted in mutually opposing directions for the tilt angle $\theta$.

FIG. 9 shows a fifth embodiment of the present invention. In the drawing, these parts constructed identically to those corresponding parts in the preceding drawings are given identical reference numerals and the description thereof will be omitted.

Referring to FIG. 9, a pair of magnetic heads 53 and 54 are accommodated in a case 55 in a state such that the magnetic heads 53 and 54 are rotated about the axis P2 passing through the upper right corner of the magnetic heads in the clockwise direction and in the counter clockwise direction. The magnetic heads are inserted into a space defined in the case 55 in the tilted state under a guidance of a guide surface defining the space similarly to the case of FIG. 6. Such a construction facilitates the assembling of the composite magnetic head assembly as is already described with reference to the embodiment of FIG. 6. Of course, the magnetic heads 53 and 54 may be rotated about the axis passing therethrough at their upper right corners.

Further, the present invention is not limited to these embodiments but various variations and modifications may be made without departing from the scope of the present invention.

What is claimed is:

1. A composite magnetic head assembly for use in a magnetic recording/reproducing apparatus for recording and/or reproducing an information signal on and from a magnetic tape passing through the magnetic head assembly in a predetermined tape transport direction, comprising:

a first base adapted to be mounted on a body of the magnetic recording and reproducing apparatus a first magnetic head provided on said first base, said first magnetic head having a first tape guide surface for guiding said magnetic tape in said tape transport direction;

a second base provided on said first base; and a second magnetic head provided on said second base in a upstream side of said tape transport direction relative to said first magnetic head and having a second tape guide surface for guiding said magnetic tape in said tape transport direction, said second magnetic head being provided adjacent said first magnetic head such that said first tape guide surface and said second tape guide surface form a substantially continuous tape guide surface;

wherein said first and second magnetic heads are held in a state such that said first and second magnetic heads are tilted in mutually opposing directions with respect to a center line passing between said magnetic heads so that said magnetic tape transported along said first and second guide surfaces is deformed to have a curved cross-section when taken perpendicularly to the tape transport direction so that said magnetic tape has a convex surface at a side thereof that makes contact with said first and second guide surfaces of the magnetic heads.

2. A composite magnetic head assembly as claimed in claim 1 in which said composite magnetic head assembly further comprises supporting means for supporting said second base on said first base, said supporting means comprising a pair of threaded holes provided on said first base in alignment in a direction substantially perpendicular to said tape transport direction, said threaded holes penetrating through said first base, and a pair of adjusting screws are threaded into said pair of threaded holes so as to penetrate through said first base and engage with said second base, wherein said pair of adjusting screws are adjusted such that said first and second magnetic heads are tilted in mutually opposing directions with respect to a center line passing between said magnetic heads and said magnetic tape guided by said first and second magnetic heads has said curved cross-section.

3. A composite magnetic head assembly as claimed in claim 2 in which said pair of adjusting screws have sharp pointed ends for making contact with said second base, and said second base is formed with a pair of corresponding depressions for accepting the sharp pointed ends of said pair of adjusting screws.

4. A composite magnetic head assembly as claimed in claim 1 wherein said first magnetic head is tilted with respect to said center line by tilting said first base relative to said body of said magnetic recording and reproducing apparatus and said second head is tilted with respect to said center line by tilting said second base relative to said first base.

5. A composite magnetic head assembly for use in a magnetic recording/reproducing apparatus for recording and/or reproducing an information signal on and from a magnetic tape passing through the assembly in a tape transport direction, comprising:

a first magnetic head having a first tape guide surface;

a second magnetic head having a second tape guide surface;

a case adapted to be mounted on the magnetic recording and reproducing apparatus for accommodating said first and second magnetic heads therein, said case being defined with first and second mounting means respectively for holding said first and second magnetic heads such that said first and second guide surfaces form a substantially continuous tape guiding surface extending in said tape transport direction and such that said first and second magnetic heads are tilted in mutually opposing directions with respect to a center line passing between said magnetic heads so that said magnetic tape guided along said first and second guide surfaces is deformed to have a curved cross-section, when sectioned in a plane perpendicular to the tape transport direction, wherein the magnetic tape has a convex surface at a side that makes contact with said first and second guide surfaces.

* * * * *